United States Patent [19]

Kalnins

[11] Patent Number: 5,037,558

[45] Date of Patent: Aug. 6, 1991

[54] LIQUID SEPARATOR

[75] Inventor: Charles M. Kalnins, The Woodlands, Tex.

[73] Assignee: Conoco Specialty Products Inc., Houston, Tex.

[21] Appl. No.: 449,832

[22] PCT Filed: Jun. 10, 1988

[86] PCT No.: PCT/AU88/00185

§ 371 Date: Dec. 8, 1989

§ 102(e) Date: Dec. 8, 1989

[87] PCT Pub. No.: WO88/09697

PCT Pub. Date: Dec. 15, 1988

[30] Foreign Application Priority Data

Jun. 10, 1987 [AU] Australia ............... PI2389
Dec. 24, 1987 [AU] Australia ............... PI6103

[51] Int. Cl.$^5$ .......................................... B01D 17/038
[52] U.S. Cl. .......................... 210/702; 210/177; 210/202; 210/259; 210/512.1; 210/521; 210/703; 210/704; 210/737; 210/787; 210/806
[58] Field of Search .............. 209/211; 210/177, 202, 210/205, 512.1, 521, 703, 787, 788, 804, 806, 175, 198.1, 259, 702, 704, 737, 513

[56] References Cited

U.S. PATENT DOCUMENTS

| 1,600,030 | 9/1926 | Ballard | 210/787 |
| 3,735,869 | 5/1973 | Carpenter et al. | 209/211 |
| 4,226,722 | 10/1980 | Jones | 210/484 |
| 4,350,596 | 9/1982 | Kennedy, Jr. | 210/806 |
| 4,683,061 | 7/1987 | Carroll | 210/512.1 |
| 4,812,225 | 3/1989 | Corti et al. | 210/787 |
| 4,851,123 | 7/1989 | Mishra | 210/806 |
| 4,941,977 | 7/1990 | Cornelissen | 210/521 |

FOREIGN PATENT DOCUMENTS

| 2922721 | 12/1980 | Fed. Rep. of Germany | 210/512.1 |
| 1121236 | 10/1984 | U.S.S.R. | 210/512.1 |
| 2167689 | 6/1986 | United Kingdom | 209/211 |

OTHER PUBLICATIONS

International Patent Publication, WO86/06653, Larox, 11-1986.
International Patent Publication WO86/03696, Carroll, 7-1986.
International Patent Publication WO86/03143, Carroll et al., 6-1986.
International Patent Publication, WO85/00760, Carroll et al., 2-1985.
OTC 5594 "Hydrocyclones: A Solution to Produced Water Treatment" by N. Meldrum, Apr. 1987.
WO85/00851, Feb. 1985.

Primary Examiner—Robert A. Dawson
Assistant Examiner—Joseph Drodge
Attorney, Agent, or Firm—John E. Holder

[57] ABSTRACT

Liquid separator including a liquid-liquid hydrocyclone (10) and a method for enhancing the operation of the liquid-liquid hydrocyclone in which the mixture to be separated is first passed through a mixing and/or residence vessel (90), such as a cross plate interceptor skimmer.

13 Claims, 2 Drawing Sheets

LIQUID SEPARATOR

This invention relates to a liquid separator for the separation of mixtures, particularly but not exclusively for separation of liquid components in a liquid mixture.

An object of the invention is to improve the operation of a hydrocyclone whereby to improve the separating efficiency, particularly but not exclusively in the case where the liquid to be separated comprises an oily water mixture with a proponderance of water.

In one aspect, the invention provides a liquid separator comprising a hydrocyclone and a mixing and/or residence vessel having an inlet for a liquid mixture to be separated, and an outlet, the outlet being coupled to the inlet of the hydrocyclone and the hydrocyclone having outlets for respectively more dense and less dense liquid components of the mixture to be separated.

Generally, the flotation device may comprise any device which utilizes induced gas or dissolved gas to increase the rate of separation of one component such as that comprising the disperse phase.

The invention also provides a method of separating liquid components in a liquid mixture one from the other in a hydrocyclone wherein the mixture is passed to a mixing and/or residence vessel before passing to the hydrocyclone.

It has been found that performance of the hydrocyclone is substantially improved by the use of the mixing and/or residence vessel.

The invention is further described by way of example only with reference to the accompanying drawings in which.

Figure 1:
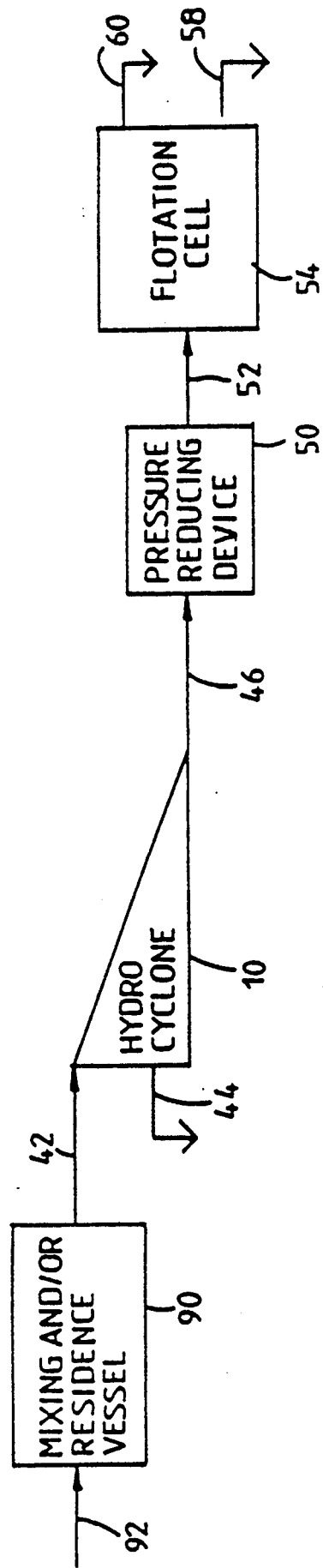
FIG. 1 shows a system in accordance with the invention.

The apparatus shown in FIG. 1 comprises a mixing and/or residence vessel 90 to which a mixture of oil and water, with a preponderance of water is admitted on a line 92. Outlet liquid from the vessel 90 is taken on a line 42 to a hydrocyclone 10.

Hydrocyclone 10 provides at an outlet line 44 separated oil and at an outlet line 46 separated water which may, however, still contain some residual oil. The water component is passed on line 46 through a pressure reducing device 50 and thence on a line 52 to a flotation cell 54. Here, further separation occurs with the water component being taken on a line 58 from the flotation cell and the oil component on a line 60 therefrom.

Figure 2:
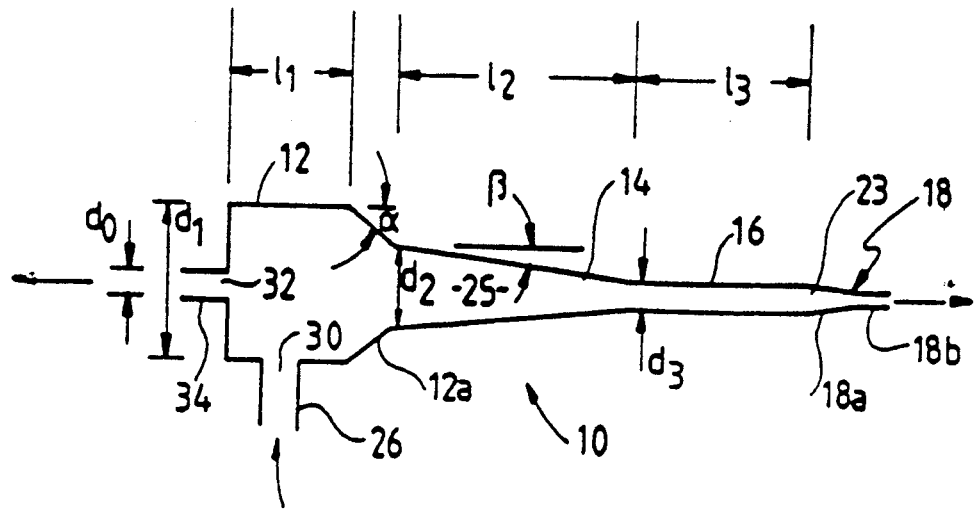
FIG. 2 is a diagram of a hydrocyclone useful in the invention.

The hydrocyclone 10 may be constructed in known fashion, such as in accordance with the teachings of U.S. Pat. No. 4,237,006, Australian patent application 84713/79, or in my International applications PCT/AU83/00028 or PCT/AU85/00010. FIG. 2 shows, diagrammatically, a separator of this general type. This is shown as having a tapered elongate separating chamber 25 which is of circular cross-section having, at its larger diameter end, a first cylindrical portion 12, a tangential inlet 26 having an inlet opening 30 and an axial overflow outlet 34 which communicates with an outlet opening 32. A tapered portion 12a of separating chamber 25 is provided adjacent portion 12, this leading to a second, also slightly tapered, portion 14 of the separating chamber 25, this in turn leading to an elongate cylindrical portion 16 of the separating chamber which opens to an axial underflow outlet 23 for the separator.

Oily water mixture to be separated is passed on the inlet 26 through the inlet opening 30 into the portion 12 of the separating chamber 25 so as to generate a vortex within the separating chamber. The oil component emerges from the outlet 34 via opening 32 and the water component emerges from the underflow outlet 23.

As shown, the first portion 12 has a length $l_1$ and a diameter $d_1$, the second portion has a length $l_2$ and diameter $d_2$ at its larger diameter end, portion 16 has a length $l_3$ and a diameter $d_3$, whilst the overflow outlet has a diameter $d_0$. As described in Australian patent application 84713/79, two strictly tangential inlets 26 may for example be provided or, as shown in International application PCT/AU85/00010, a single inlet 26 of involute form may be provided.

The cyclone separator may be constructed in accordance with any one or more or all of the following dimensional constraints:

$$l_2/d_2 \geq 10, \text{ such as } 10 \leq l_2/d_2 \leq 25$$

$$3 \leq \frac{\pi d_i d_2}{4A_i} \leq 30$$

$$\text{such as } 3 \leq \frac{\pi d_i d_2}{4A_i} \leq 20$$

$$d_0/d_2 \leq 0.25, \text{ such as } d_0/d_2 < 0.1$$

$$d_1 > d_2$$

$$d_2 > d_3$$

where $A_i$ is the total inlet area of all of the inlet openings combined or the inlet opening if there is only one. $\beta$, the half angle of the taper of the second portion, may be 20' to 2°, such as 1°. Portion 12a is optional. If provided, it may have a half angle, $\alpha$, of 10°.

Other suitable constructions for hydrocyclone 10 are shown, for example, in the specification of Australian patent application 77610/87 and of International application PCT/AU87/00402, PCT/AU86/00313, PCT/AU86/00173 and PCT/AU85/00181.

In the construction shown in FIG. 2, the overflow outlet 23 communicates with a fourth portion 18 of the separator, which has the effect of providing a back pressure to facilitate the separating action. Such a fourth portion is described in International application PCT/AU83/00028 and may, as shown, comprise a first frustoconical portion 18a which leads from outlet 23 followed by a second cylindrical portion 18b. When used in the apparatus of FIG. 1, this arrangement provides a pressure reducing action and permits omission of the pressure reducing device 50, line 46 in that case communicating directly with line 52 to admit material from the separator 10 directly to the flotation cell.

Figure 3:
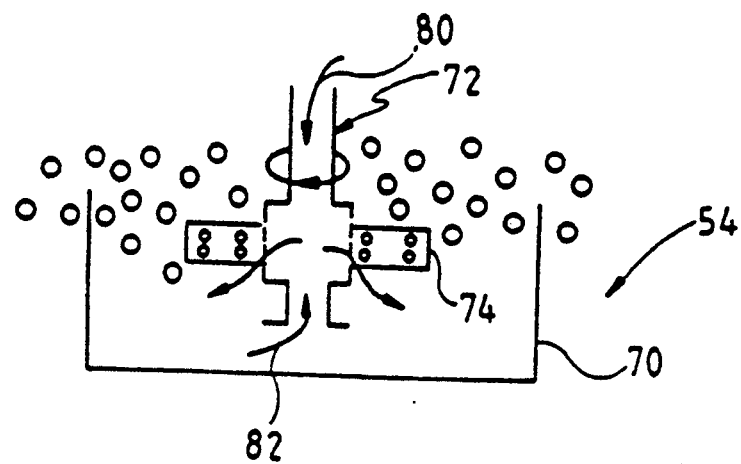
FIG. 3 is a diagram of a flotation cell useful in the invention.

The flotation cell 54 may also be constructed in accordance with conventional practice and may be of the dissolved gas type or of the induced air or gas types. FIG. 3 shows, in diagrammatic form, one such form being of the induced air type. Here, a vessel 70 is provided into which the material to be separated is admitted. A rotor 72 is positioned within the vessel 70 and has impeller blades 74 in use rotated together with the impeller about a vertical axis. The design is such that air is drawn into the upper part of the rotor 72, as shown by arrow 80, and can then pass through perforations in the rotor sidewardly outwardly therefrom and into the material to be separated. At the same time, the rotor draws material in the vessel upwardly into the rotor, also to pass outwardly through the aforementioned perforations. Material so admitted is shown diagrammatically, by arrow 82. In this arrangement, the air emerging from the rotor at the side openings thereof is in the form of bubbles which adhere to a desired one of the components to be separated so that component is effectively lightened, whereby to float to the surface of the material within the vessel 70. This action may be facilitated by addition of suitable chemicals, such as surfactants. The means for admitting and removing the mixture to be separated, and the resultant separated components, is not shown, but the line 52 may communicate directly with the interior of the vessel 70, with the outlet for the downwardly settling component located towards the base of the cell for take off as desired. The component which rises to the surface may simply overflow the sides of the cell to be collected for take off in a suitable peripheral channel. In the present context, the cell 54 is arranged whereby the component which floats to the top of the vessel is oil, and that which settles is water.

In the described arrangement, the mixing or residence vessel has been found to be particularly satisfactory in assisting in enhancing the operation of the hydrocyclone, whereby to enable it to be capable of producing very pure output. Particularly where used as a separator for oily water, the water which emerges from the outlet 23 may be particularly pure and can be further improved in purity by passing through the flotation cell 54.

The hydrocyclone 10 acts, as described, to effect removal of an oil component from an oily-water mixture when admitted thereto. Generally, the separator 10 is designed for use where there is a substantially smaller amount of oil than water in the incoming mixture. However, the concentration of oil may be of the order of several percent for example.

The hydrocyclone 10 is able to reduce the oil concentration to a quite low level in the water component which emerges from the outlet thereof, such as below 500 ppm. Then, after passage through the pressure reducing device 50 or through the portion 18 of the described hydrocyclone, the oily water as then passed to the flotation cell is further separated to reduce the oil component to an even lower level. Thus, the emergent water from line 58 may be relatively very pure indeed, such as having an oil concentration of only a few parts per million.

The provision of the hydrocyclone 10, in addition to providing a separating action, also assists in that a substantial pressure drop, will normally exist as between the inlet line 42 and the outlet 23 from the separator. This reduction in pressure, which may for example be 50%, has the effect that oil in solution in the water will tend to come out of solution and form droplets which, even if they are not separated totally in the cyclone 10 to emerge from the outlet line 44, and can be more readily be agglomerated together or are otherwise more readily capable of adherence by the bubbles in the flotation cell to effect final separation.

The pressure reducing device 50, although preferable, may be omitted in some instances, as indicated. It is also possible to use, as the pressure reducing device, a suitable valve, or if desired, another hydrocyclone, particularly one designed to remove solids from admitted liquid.

Arrangements such as shown in FIG. 1 are suitable for applications where stringent requirements exist for purity of the separated water, such as on off-shore wells where the purified water is to be returned to the sea and where, usually, strict environmental protection will preclude return of water having any significant oil component present therein.

The described mixing and/or residence vessel may be constructed as a pressure rated vessel. It may be arranged for upstream mixing of chemicals into the incoming mixture (for example, oil-water mixture) fed to the hydrocyclone 10, and arranged to permit a residence time for liquid therein which is sufficient to permit the chemicals to coalesce the mixture. The vessel may be placed downstream of a pump, such as a single stage centrifugal or other high shear pump, and may then act to effect the described coalescence. The vessel may also take the form of a large cyclonic device, acting as a pre coalescer, either with or without chemical addition to the incoming material. Cross plate interceptor skimmers have been found suitable. It is also possible in some instances to facilitate operation by positioning a low shear pressure increasing device, such as a suitable pump, either in line 92, to act on the inlet mixture prior to entering the vessel 90, or in line 42 to act on the mixture having left vessel 90, prior to entry into hydrocyclone 10. By the term "low shear pressure increasing device" is meant any pressure increasing device, such as a pump effective to increase liquid pressure without inducing substantial shear stress in the liquid.

Provision may be made for inlet into vessel 90 separately or in admixture with liquid in line 92, of heated water or other fluid, such as from a heater treater device. Such device may effect injection of heated water periodically.

In the described arrangement flotation cell 54 may in some circumstances, be omitted.

The described arrangement has been advanced merely by way of explanation and many modifications may be made thereto without departing from the spirit and scope of the invention as defined in the appended claims.

I claim:

1. A liquid/liquid separator means for separating an oil/water liquids mixture, comprising a residence vessel means arranged to effect coalescence of the liquids in the mixture to aid in separation thereof and having an inlet for the liquids mixture to be separated, and an outlet, a hydrocyclone constructed, dimensioned and arranged to effect separation of the oil/water liquids mixture and having at least one inlet, the outlet of said residence vessel means being coupled to the at least one inlet of the hydrocyclone, and the hydrocyclone having outlets means for outletting a primarily more dense and less dense liquid component respectively of the liquids mixture to be separated, said outlets means including means comprising an underflow outlet for outlet of a primarily more dense water component of the mixture.

2. A liquid separator as claimed in claim 1 including a flotation device coupled to receive the more dense component of the mixture from the hydrocyclone for providing further separation of said more dense liquid components.

3. A liquid separator as claimed in claim 2 wherein a pressure reducing device is coupled between the hydrocyclone and the floating device to reduce pressure of liquid passed from the hydrocyclone to the flotation device.

4. A liquid separator as claimed in claim 1 wherein said residence vessel comprises a cross plate interceptor skimmer.

5. A liquid separator as set forth in claim 1 wherein said residence vessel is provided with means for introducing into the mixture therein chemicals to coalesce the mixture.

6. A liquid separator as set forth in claim 1 wherein provision is made, in said residence vessel, for inlet into the liquid mixture therein of heated fluid.

7. A method of separating liquid oil and water components in a liquid mixture one from the other in a hydrocyclone constructed, dimensioned and arranged to effect separation of the oil/water liquids mixture and having at least one inlet and outlet means for outletting a primarily more dense and less dense component of the liquid mixture, said outlet means including means comprising an underflow for outlet of a primarily more dense water component of the liquid mixture; comprising, the steps of passing the liquid mixture to a residence vessel to provide for coalescence of at least one of the components in the residence vessel before passing the liquid mixture to the hydrocyclone.

8. A method as claimed in claim 7 wherein the more dense liquid component as separated by said hydrocyclone is passed to a flotation device for further separation of the oil and water components thereof.

9. A method as claimed in claim 8 wherein said liquid taken from the hydrocyclone is passed through a pressure reducing device before entering said flotation device.

10. A method as claimed in claim 7 wherein said residence vessel comprises a cross plate interceptor skimmer.

11. A method as claimed in claim 7 comprising introducing into the mixture in said residence vessel chemicals to coalesce one of the components of the mixture.

12. A method as claimed in claim 7 further comprising inletting into the residence vessel heated liquid or other fluid to mix with the mixed materials therein.

13. A separating system means for separating less dense oil and more dense water components from a liquid mixture comprising a residence vessel means arranged to provide for coalescence of at least one component of an inletted oil/water liquids mixture; a hydrocyclone downstream of the residence vessel, said hydrocyclone being constructed, dimensioned and arranged to effect separation of oil and water components from a liquid mixture and having an inlet means thereinto for receiving the mixture from the residence vessel means and at least two outlets for passing separated oil and water components therefrom, said outlets including means comprising an underflow outlet for outletting primarily a more dense water component; and a floatation device means downstream of said hydrocyclone for receiving the more dense water component of the mixture to provide further separation of the components of the mixture.

* * * * *